(12) United States Patent
Ghosh et al.

(10) Patent No.: US 11,410,378 B1
(45) Date of Patent: Aug. 9, 2022

(54) IMAGE PROCESSING FOR GENERATING THREE-DIMENSIONAL SHAPE AND SPATIALLY-VARYING REFLECTANCE OF THE OBJECT USING A DEEP NEURAL NETWORK

(71) Applicant: Imperial College Innovations Limited, London (GB)

(72) Inventors: Abhijeet Ghosh, Orpington (GB); Valentin Deschaintre, London (GB); Yiming Lin, London (GB)

(73) Assignee: Imperial College Innovations Limited, London (GB)

( * ) Notice: Subject to any disclaimer, the term of this patent is extended or adjusted under 35 U.S.C. 154(b) by 0 days.

(21) Appl. No.: 17/224,401

(22) Filed: Apr. 7, 2021

(30) Foreign Application Priority Data

Feb. 22, 2021 (GB) .................................. 2102482

(51) Int. Cl.
*G06T 15/50* (2011.01)
*G06N 3/04* (2006.01)
(Continued)

(52) U.S. Cl.
CPC ............. *G06T 15/506* (2013.01); *G06N 3/04* (2013.01); *G06T 7/50* (2017.01); *G06T 7/55* (2017.01); *G06T 15/04* (2013.01); *G06T 15/205* (2013.01)

(58) Field of Classification Search
CPC ..... G06T 15/04; G06T 15/205; G06T 15/506; G06T 7/50–596; G06N 3/04
See application file for complete search history.

(56) References Cited

U.S. PATENT DOCUMENTS

2021/0174528 A1* 6/2021 Mordechai ............. G01S 17/89
2021/0356572 A1* 11/2021 Kadambi ............... G01B 11/24

FOREIGN PATENT DOCUMENTS

CN 112164017 A * 1/2021 .......... G06K 9/6256

OTHER PUBLICATIONS

Blin, Rachel, et al. "Road scenes analysis in adverse weather conditions by polarization-encoded images and adapted deep learning." 2019 IEEE Intelligent Transportation Systems Conference (ITSC). IEEE, 2019. (Year: 2019).*

(Continued)

Primary Examiner — Daniel F Hajnik
(74) Attorney, Agent, or Firm — Umberg Zipser LLP; Ryan Dean

(57) ABSTRACT

A method of image processing is described. The method comprises receiving a set of at least three images of an object including at least two linearly-polarized images and at least one color image, wherein the three images have the same view of the object and are acquired under the same illumination condition in which either diffuse polarization or specular polarization dominates in surface reflectance, and wherein a set of Stokes parameters $s_0$, $s_1$ and $s_2$ is determinable from the at least three images. The method further comprises generating three-dimensional shape and spatially-varying reflectance of the object from the set of at least three images using a deep neural network trained with a plurality of sets of training images, each of the plurality of sets of training images including at least three training images including at least two linearly-polarized training images and at least one color image from which a respective set of Stokes parameters $s_0$, $s_1$ and $s_2$ is determinable and storing said three-dimensional shape and spatially-varying reflectance generated by the deep neural network.

23 Claims, 12 Drawing Sheets

(51) Int. Cl.
*G06T 7/55* (2017.01)
*G06T 7/50* (2017.01)
*G06T 15/04* (2011.01)
*G06T 15/20* (2011.01)

(56) References Cited

OTHER PUBLICATIONS

Blanchon, Marc, et al. "P2D: a self-supervised method for depth estimation from polarimetry." arXiv preprint arXiv:2007.07567 (2020). (Year: 2020).*

Wang, Yong, et al. "An end-to-end cnn framework for polarimetric vision tasks based on polarization-parameter-constructing network." arXiv preprint arXiv:2004.08740 (2020). (Year: 2020).*

A. Kadambi et al.: "Polarized 3D: High-quality depth sensing with polarization cues", Proceedings of the IEEE International Conference on Computer Vision, pp. 3370-3378 (2015).

J. Riviere et al.: "Polarization imaging reflectometry in the wild", ACM Transactions on Graphics, vol. 36, No. 6, Article 206 (2017).

M. Boss et al.: "Two-shot spatially-varying brdf and shape estimation", IEEE Conference on Computer Vision and Pattern Recognition (CVPR), 2020.

V. Deschaintre et al.: "Single-Image SVBRDF Capture with a Rendering-Aware Deep Network", ACM Transactions on Graphics, vol. 37, No. 4, Article 128 (2018).

Z. Li et al.: "Learning to reconstruct shape and spatially-varying reflectance from a single image", ACM Transactions on Graphics, vol. 37, No. 6, Article 269 (2018).

European Patent Office, International Search Report and Written Opinion, International Application No. PCT/GB2022/050470, dated May 25, 2022, 14 pages.

* cited by examiner

Captured inputs 5

Computed inputs 13

Polarized renderings 27    Polarization cues 28    Ground truth 29

Synthetic training data 23

Linear polarizer in a horizontal 0° orientation (Max)

Linear polarizer in a vertical 90° orientation (Min)

DOP computed from Max and Min

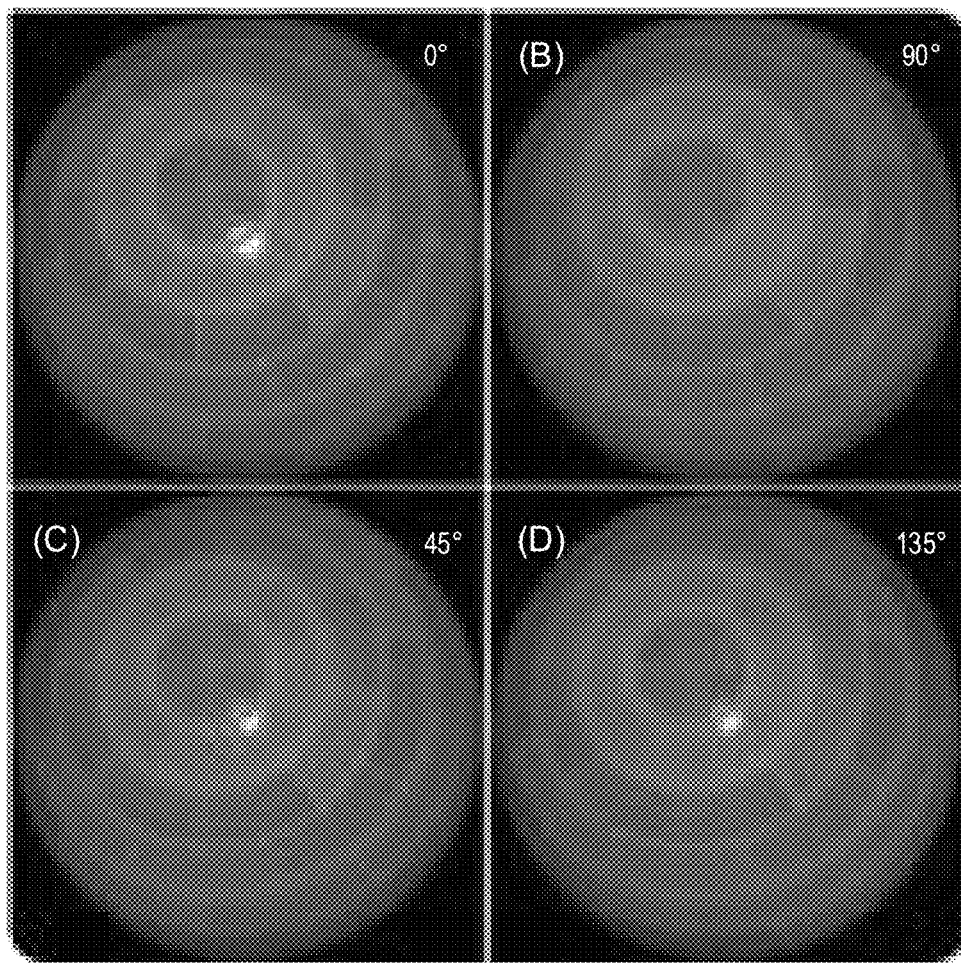
FIG. 13A  FIG. 13B
FIG. 13C  FIG. 13D
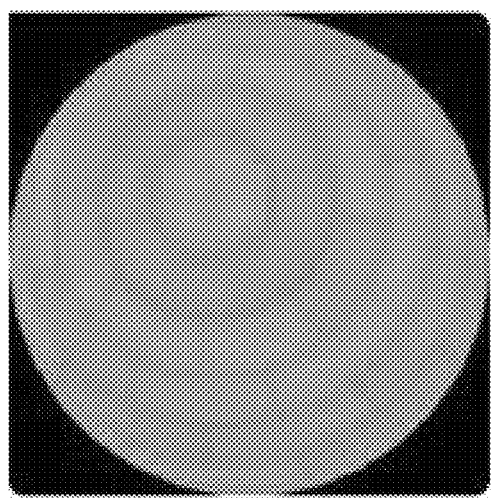
FIG. 14
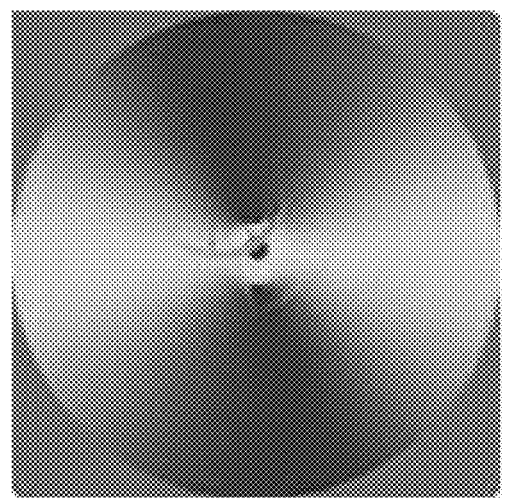
FIG. 15

US 11,410,378 B1

IMAGE PROCESSING FOR GENERATING THREE-DIMENSIONAL SHAPE AND SPATIALLY-VARYING REFLECTANCE OF THE OBJECT USING A DEEP NEURAL NETWORK

FIELD

The present invention relates to image processing, in particular to estimating three-dimensional shape and spatially-varying reflectance of an object from a set of images of the object.

BACKGROUND

Accurately acquiring the shape and appearance of real-world objects and materials has so been an active area of research in vision and graphics with a wide range of applications including, for example, analysis/recognition, and digitization for visual effects, games, virtual reality, cultural heritage, advertising and design. Advances in digital imaging over the last two decades has resulted in image-based acquisition techniques becoming an integral component of appearance modelling and three-dimensional (3D) reconstruction.

J. Riviere et al.: "Polarization imaging reflectometry in the wild", ACM Transactions on Graphics, volume 36, no. 6, Article 206 (2017) describes on-site acquisition of surface reflectance for planar, spatially varying, isotropic samples in uncontrolled outdoor environment. It employs linear-polarization imaging from two, near-orthogonal views, close to the Brewster angle of incidence, to maximize polarization cues for surface reflectance estimation.

Z. Li et al.: "Learning to reconstruct shape and spatially-varying reflectance from a single image", ACM Transactions on Graphics, volume 37, no. 6, Article 269 (2018) (herein referred to as "Li et al.") describes recovering spatially-varying bidirectional reflectance distribution function (SVBRDFs) and complex geometry from a single RGB image captured under a combination of unknown environment illumination and flash lighting by training a deep neural network to regress shape and reflectance from the image.

V. Deschaintre et al.: "Single-Image SVBRDF Capture with a Rendering-Aware Deep Network", ACM Transactions on Graphics, volume 37, no. 4, Article 128 (2018) (herein referred to as "Deschaintre et al.") describes using a neural network to reconstruct complex SVBRDFs of planar samples given a single input photograph under flash illumination, based on training using only synthetic data.

A. Kadambi et al.: "Polarized 3D: High-quality depth sensing with polarization cues", Proceedings of the IEEE International Conference on Computer Vision, pages 3370-3378 (2015) (herein referred to as "Kadambi et al.") describes using polarization enhance depth maps obtained using a Microsoft® Kinect depth sensor. Y. Ba et al.: "Deep shape from polarization", European Conference on Computer Vision (ECCV), 2020 (herein referred to as "Ba et al.") describes a deep learning-based approach to inferring the shape of a surface under uncontrolled environment illumination using polarization imaging. Both Kadambi et al. and Ba et al. only estimate shape.

M. Boss et al.: "Two-shot spatially-varying brdf and shape estimation", IEEE Conference on Computer Vision and Pattern Recognition (CVPR), 2020 (herein referred to as "Boss et al.") describes a cascaded network and guided prediction networks for SVBRDF and shape estimation from two-shot images, under flash and ambient environmental illumination respectively.

SUMMARY

According to a first aspect of the present invention there is provided a method comprising receiving a set of at least three images of an object including at least two linearly-polarized images (for example, at least two linearly-polarized color images) and at least one color image (which may or may not be linearly-polarized), wherein the three images have the same view of the object and are acquired under the same illumination condition (in other words, for each of the at least three images, the object is illuminated in the same way, e.g., from the same, single fixed point, from the same, multiple fixed points, or from the same fixed range or extent of illumination) in which either diffuse polarization or specular polarization dominates in surface reflectance, and wherein a set of Stokes parameters $s_0$, $s_1$ and $s_2$ is determinable from the at least three images. The method further comprises generating three-dimensional shape and spatially-varying reflectance of the object from the set of at least three images using a deep neural network trained with a plurality of sets of training images, each of the plurality of sets of training images including at least three training images including at least two linearly-polarized training images and at least one color image from which a respective set of Stokes parameters $s_0$, $s_1$ and $s_2$ is determinable and storing said three-dimensional shape and spatially-varying reflectance generated by the deep neural network.

The three-dimensional shape and spatially-varying reflectance can be used to render a high-quality image of the object under new lighting conditions.

The images are preferably acquired under controlled illumination, for example, indoors or, if outdoors, under cloudy conditions or other suitably shaded conditions providing uniform illumination, whereby polarized illumination is minimised or minimal such that it is not dominant.

The illumination may be flash illumination such that diffuse polarization dominates and, thus, the Stokes map may be based on diffuse polarization. The illumination may be unpolarized. The flash illumination may, however, be linearly polarized or circularly polarized. The flash illumination may include a mixture of polarized light (linearly- and/or circularly-polarized light) and/or unpolarized light.

The illumination may be uniform and surround the object (e.g., spherical or hemispherical illumination) such that specular polarization dominates. The uniform illumination may be unpolarized or circularly-polarized for non-planar 3D objects. The uniform illumination may include a mixture of circularly-polarized light and unpolarized light for non-planar 3D objects. For a planar object, the uniform illumination may be from an extended or a sufficiently large area light source or light panel or display panel, or even locally uniform environmental illumination. For planar objects, the uniform illumination from an extended area-light may be unpolarized, linearly-polarized or circularly-polarized.

The set of at least three images may comprise at least three color images. The at least two linearly-polarized images and at least one color image may comprise at least two linearly-polarized colour images.

A set of Stokes parameters $s_0$, $s_1$ and $s_2$ is determinable from the at least three images, for example, if the at least two linearly-polarized images include first and second linearly-polarized images in which the angle of polarization between the first and second images are separated by 45°. A set of Stokes parameters $s_0$, $s_1$ and $s_2$ is determinable from the at least three images, for example, if the at least two linearly-polarized images include first, second and third linearly-polarized images in which the angle of polarization are 0°, 45° and 90° respectively. The set of linear Stokes parameters may be determined by a different combination of angles of polarization, such as, for example, 0°, 60° and 120° respectively.

At least the unpolarised Stokes parameter $s_0$ has color. The horizontally polarized reflectance Stokes parameter $s_1$ and/or the polarization reflectance Stokes parameter $s_1$ may have color.

The object may be a three-dimensional object, that is, an object which is not substantially flat or planar, and/or includes one or more convex surface(s). The three-dimensional object may include whole or part of a human subject (e.g., face or full-body), an animal or a plant. The object, however, may be a planar object.

The method may further comprise receiving a polarization shape map generated from the Stokes parameters $s_1$ and $s_2$ for the object and/or a colour map and/or a degree of polarization (DOP) map, or generating a polarization shape map from the Stokes parameters $s_1$ and $s_2$ for the object and/or a colour map and/or a DOP map using the set of at least three images. The three-dimensional shape and spatially-varying reflectance may be generated from the set of at least three images and the polarization shape map and/or the colour map and/or the DOP map.

The color map may be a diffuse color map. The polarization shape map may be a normalised Stokes map or an angle of polarization map. The degree of polarization (DOP) map may be a diffuse DOP map or a specular DOP map.

The plurality of sets of training images may comprise a plurality of sets of synthesized training images. For example, the plurality of sets of synthesized training images may so be generated using a plurality of meshes of objects and a plurality of different spatially-varying bidirectional reflectance distribution function (SVBRDs) corresponding to different materials. Generation of a training image may include selecting a mesh and a material and randomly rotating the mesh and material.

Additionally or alternatively, the plurality of sets of training images may comprise a plurality of sets of measured training images.

The at least three images of the object may comprise three or four linearly-polarized images, for example, three or four linearly-polarized color images.

The three-dimensional shape may comprise a surface normal map and a depth map. The spatially-varying reflectance may comprise a diffuse albedo map, and a specular albedo map, and/or a specular roughness map.

The deep neural network may comprise a convolutional neural network having an encoder and a decoder and skip connections between the encoder and decoder. The decoder may be a branched decoder comprising at least two branches. The skip connections may include at least one residual block or a series of at least two residual blocks. The deep neural network trained by considering rendering losses for each linearly-polarized image. The deep network may include a parallel arrangement of a U-Net image-to-image network and a global features network.

The set of at least three images may be acquired using frontal flash illumination (which may be unpolarized, or linearly or circularly polarized) incident on the object so as to cause diffuse polarization to dominate in the surface reflectance. The frontal illumination can be from a flash or a projector. Alternatively, the set of at least three images may be acquired using uniform illumination (which may be unpolarized or circularly polarized) disposed around and directed at the object so as to cause specular polarization to dominate in the surface reflectance. The uniform illumination may comprise a plurality of light sources arranged in a hemisphere or sphere around the object, or surrounding the object, to provide uniform illumination on the object.

If the object is a planar object, uniform illumination can be achieved using an extended or a sufficiently large area-light source or light panel or display panel, or locally-uniform environmental illumination incident on the object at near normal incidence or so obliquely incident at near Brewster angle of incidence. For a planar object, the uniform illumination may be unpolarized, linearly polarized or circularly polarized.

According to a second aspect of the present invention there is provided a method comprising receiving a set of linearly-polarized color images of an object, each linearly-polarized image having a different angle of polarization, the linearly-polarized color images having the same view of the object and acquired using unpolarized, frontal, flash illumination of the object. The method may optionally include receiving a reflectance map and a shape map for the object generated from the set of linearly-polarized images. The method comprises generating three-dimensional shape and spatially-varying reflectance of the object from the set of linearly-polarized images, and optionally the reflectance map and the shape map, using a deep neural network trained with a synthetic or measured dataset, wherein the synthetic or measured dataset includes a plurality of sets of data, each set of data including a set of linearly-polarized images having different polarizations, and optionally a reflectance map and a shape map generated from the linearly-polarized images, and ground truth three-dimensional shape and spatially-varying reflectance and storing said three-dimensional shape and spatially-varying reflectance generated by the deep neural network According to a third aspect of the present invention is provided a computer program comprising instructions for performing the method of the first or second aspect.

According to a fourth aspect of the present invention is provided a computer program product comprising a computer readable medium (which may be non-transitory) storing the computer program of the third aspect.

According to a fifth aspect of the present invention there is provided a device comprising at least one processor and storage. The at least one processor is configured, in response to receiving a set of at least three images of an object including at least two linearly-polarized images and at least one color image, wherein the three images have the same view of the object and are acquired under the same illumination condition in which either diffuse polarization or specular polarization dominates, wherein a set of Stokes parameters $s_0$, $s_1$ and $s_2$ is determinable from the at least three images, to generate three-dimensional shape and spatially-varying reflectance of the object from the set of at least three images using a deep neural network trained with a plurality of sets of training images, each of the plurality of sets of training images including at least three training images including at least two linearly-polarized training images and at least one color image from which a respective set of Stokes parameters $s_0$, $s_1$ and $s_2$ is determinable and to store said three-dimensional shape and spatially-varying reflectance generated by the deep neural network in the storage.

The at least one processor may receive a polarization shape map generated from the Stokes parameters $s_1$ and $s_2$ for the object and/or a colour map and/or a degree of polarization (DOP) map. The at least one processor may further be configured to generate a polarization shape map from the Stokes parameters $s_1$ and $s_2$ for the object and/or a colour map and/or a DOP map using the set of at least three color images. The at least one processor may be configured to generate three-dimensional shape and spatially-varying reflectance from the set of at least three color images and the polarization shape map and/or the colour map and/or the DOP map.

The device may further comprise a color digital camera and a linear polarizing filter for acquiring the at least three color images.

The device may further comprise or be provided with a flash or a projector for providing directional illumination on the object, preferably from a frontal direction. The device may further comprise or be provided with a one or more light sources (for example, light emitting diodes, light panels or display panels) and, optionally, one or more reflecting surfaces arranged around the object to provide uniform illumination on the object. Light from the one or more light sources may be bounced from the one or more reflecting surfaces(s).

The one or more light sources may comprise a plurality of light sources arranged in a hemisphere or sphere around the object. The one or more reflecting surfaces may comprise plurality of reflecting surfaces arranged in a hemisphere or sphere around the object. The reflecting surface(s) may be concave. The reflecting surface(s) may provide diffuse reflection.

The at least one processor may include one or more central processing units (CPUs). The at least one processor may include one or more graphical processing units (GPUs).

According to a sixth aspect of the present invention there is provided a method of training a deep neural network. The method comprises providing a plurality of sets of training images and corresponding ground truth three-dimensional shape and spatially-varying reflectance of objects to a deep neural network, each set of training images including at least three training images including at least two linearly-polarized training images (for example, at least two linearly-polarized color images) and at least one color image (which may or may not be linearly-polarized) from which a respective set of Stokes parameters $s_0$, $s_1$ and $s_2$ is determinable; and storing the trained deep neural network.

The method may further comprise providing a polarization shape map generated from the Stokes parameters $s_1$ and $s_2$ and/or a colour map and/or a DOP map.

The set of training images may comprise a plurality of sets of synthesized training images and/or measured training images.

According to a seventh aspect of the present invention is provided a computer program comprising instructions for performing the method of the sixth aspect.

According to an eighth aspect of the present invention is provided a computer program product comprising a computer readable medium (which may be non-transitory) storing the computer program of the seventh aspect.

According to a ninth aspect of the present invention there is provided apparatus for comprising at least one processor and storage for training a deep neural network.

BRIEF DESCRIPTION OF THE DRAWINGS

Certain embodiments of the present invention will now be described, by way of example, with reference to the accompanying drawings, in which:

FIGS. 13A, 13B, 13C and 13D illustrate simulated linearly-polarized images at 0°, 45°, 90°, 135° respectively of a sphere having a surface comprised of tiled, green stone material acquired using frontal flash illumination;

FIG. 14 is a simulated normalized color map of the sphere shown in FIGS. 13A to 13D; and FIG. 15 is a simulated Stokes map obtained from the linearly-polarized images shown in FIGS. 13A to 13D illustrating dominance of diffuse polarization which is independent of the polarization state of flash illumination.

DETAILED DESCRIPTION OF CERTAIN EMBODIMENTS

Introduction

Practical acquisition of shape and spatially varying reflectance of three-dimensional (3D) objects is herein described which can recover the appearance of an object, for example, under different lighting conditions. The method employs acquiring polarization images with frontal flash illumination and exploits polarization cues in conjunction with deep learning. A high-dynamic range (HDR) synthetic dataset is created by simulating polarization behaviour on different geometries and spatially varying bi-directional reflectance distribution functions (SVBRDFs) which is used to train a deep network using supervised learning. This can then be used to estimate the 3D shape as surface normal and depth maps, and spatially varying reflectance properties, in the form of diffuse and specular albedo maps and specular roughness map. This enables high-quality renderings of acquired objects under new lighting conditions.

Overview

Figure 1:
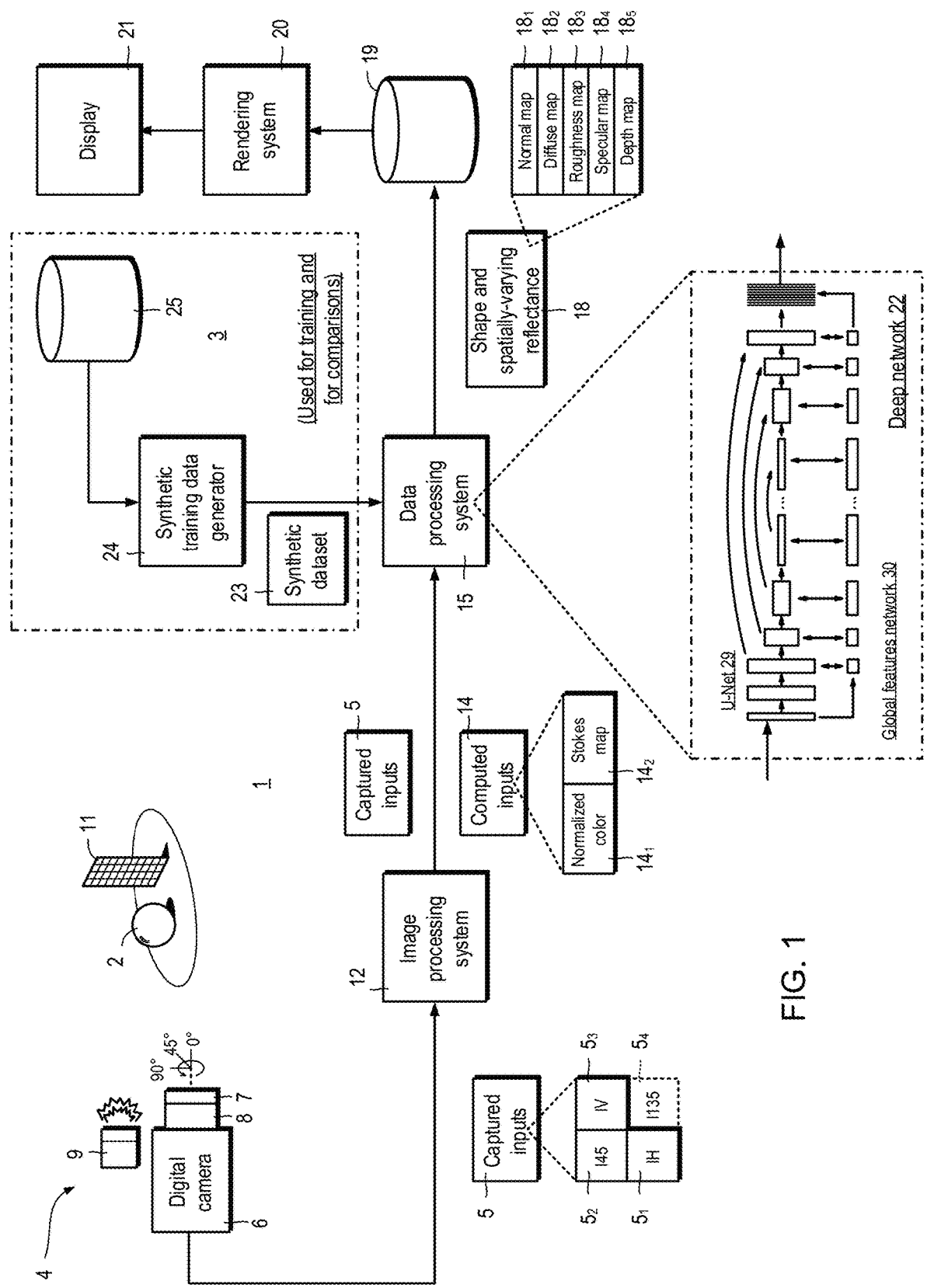
FIG. 1 is a block diagram of a system for estimating object shape and spatially-varying bidirectional reflectance distribution function (SVBDRF) from polarization cues, the system including a trained deep network.

FIG. 1 shows a system 1 which can be used to capture polarised color images of an object 2, to use the captured images to compute further cues and to estimate object shape and SVBDRF using a trained deep network. FIG. 1 also shows a system 3 which is used to generate synthetic training data which is used to train the deep network.

Figure 2A:
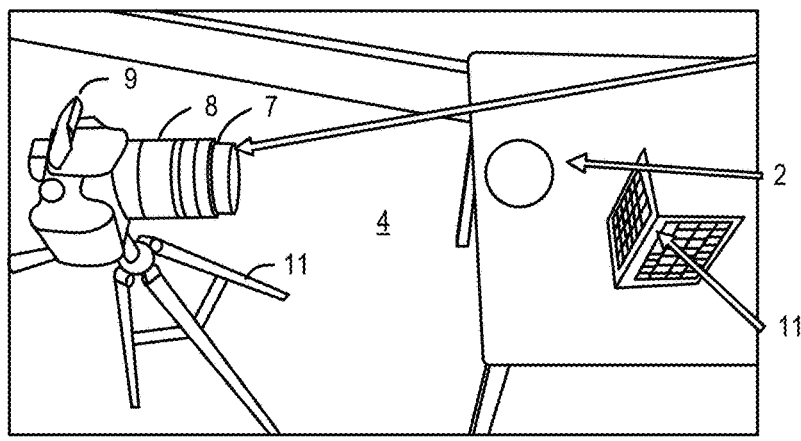
FIG. 2A illustrates a system for capturing polarized images.

Referring to FIGS. 1 and 2A, an image-capturing system 4 for capturing linearly-polarized images 5 (or "captured inputs") of an object 2 includes a color digital camera 6 (herein simply referred to as a "camera"), a linear polarizing filter 7 mounted on the lens unit 8 of the camera 6, and a light source 9 in the form of an unpolarized flash 9. The camera 6 may be stably mounted on a tripod 10 (not shown in FIG. 1). A color checker chart 11 for white balancing and radiometric calibration of the observed reflectance may be provided. The color checker chart can be omitted particularly if the measurements are pre-calibrated. Off-the-shelf equipment can be used for the image-capturing system 4. In particular, the camera 6 takes the form of a digital single-lens so reflex (DSLR) camera, although other forms of digital cameras can be used. In particular, a camera may be used having an integrated polarization sensor such as a Sony® Polarsens®, thereby obviating the need for an external linear polarizing filter. Images need not be captured under laboratory or studio conditions, provided flash illumination is the dominant illumination. The object may be all or part of a human subject, such as the face or body, an animal or a plant.

Figure 2B:
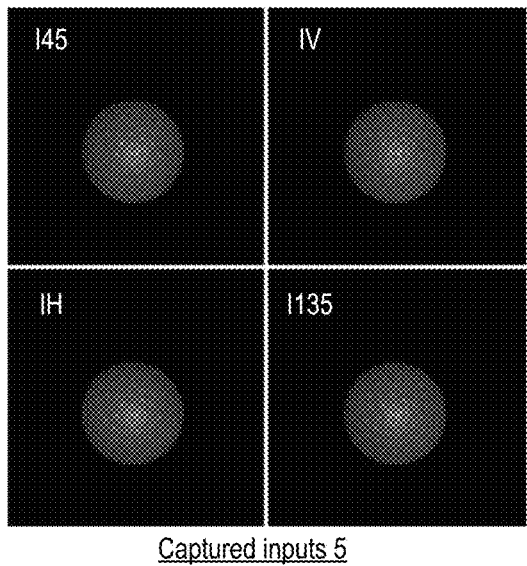
FIG. 2B illustrates captured polarized images (or "captured inputs")
Figure 4:
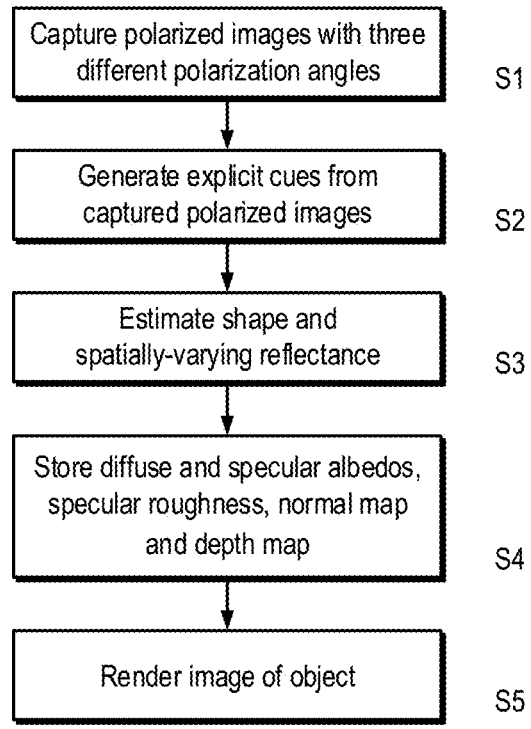
FIG. 4 is a process flow diagram of a method of estimating object shape and SVBDRF.

Referring to FIGS. 1, 2B and 4, three images $5_1$, $5_2$, $5_3$ are captured which allow Stokes parameters $s_0$, $s_1$, $s_2$ to be found (step S1). In this case, first, second and third linearly-polarized images $5_1$, $5_2$, $5_3$ are captured, with the angle of polarization of the filter 7 set to 0°, 90° and 45° respectively. A fourth polarized image $5_4$ can be captured with the angle of polarization set to 135°. Alternatively, the image $5_4$ can be constructed from the other images $5_1$, $5_2$, $5_3$. Other angles for polarization can be used. For example, the first, second and third linearly-polarized images $5_1$, $5_2$, $5_3$ have angles of polarization set to 0°, 60° and 120° respectively. Not all the captured images $5_1$, $5_2$, $5_3$ need be linearly-polarized. For example, the first and second images $5_1$, $5_2$ may be linearly-polarized having angles of polarization set to 0° and 45° and the third image $5_3$ may be unpolarized.

The same illumination condition is used to capture the images. In other words, for each image, the object is illuminated in the same way from the same, single fixed point, i.e., the flash, which is in a fixed position. Expressed differently, multiple different illumination conditions are not used for the set of (three) images, for example, by positioning the flash in different positions or by using another flash in a different position for a different image acquisition when acquiring each respective image. As will be explained in more detail hereinafter, single, frontal flash illumination, however, need not be used. Instead, the same illumination conditions can be provided by multiple fixed points (such as a spherical or hemispherical array of light sources) or from the same fixed extended range of illumination (such as light panels) or other fixed illumination arrangements. The same or substantially the same illumination light intensity is preferably used.

Figure 2C:
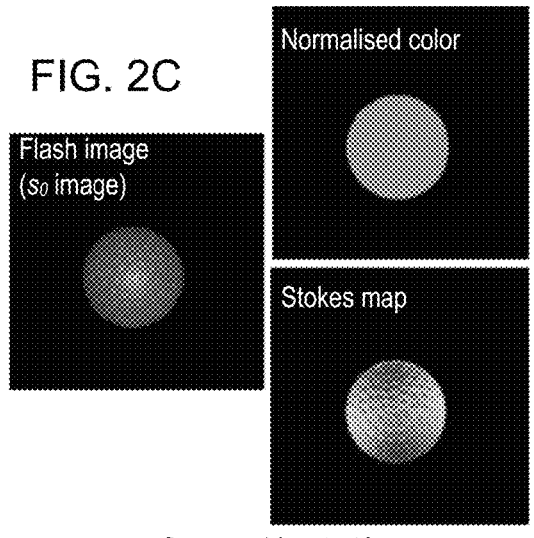
FIG. 2C illustrates computed explicit cues (or "captured inputs")

Referring to FIGS. 1, 2C and 4, an image processing system 12, which may be implemented in software on a processor-based computer system (not shown), can be used to generate computed images 14 (or "further cues") from the captured images 5 (step S2). The computed images 14 include a normalised color map $14_1$ and a polarization shape map $14_2$ (or "π-ambiguous shape map") in which the shape cue is computed from the horizontally polarized reflectance $s_1$ and 45° polarization reflectance $s_2$ and which takes the form of normalised Stokes map $14_2$. The computed images 13 can also include an unpolarized flash image (or "$s_0$ image").

Referring to FIGS. 1, 2D, 3 and 4, a data processing system 15, which may be implemented in software, hardware, a field programmable gate array (FPGA), or using a graphics processing unit (GPU), in computer system (not shown), is used for estimate the 3D shape and SVBDRF 18, specifically a normal map $18_1$, a diffuse map $18_2$, a roughness map $18_3$, a specular map $18_4$ and a depth map $18_5$ (step S3). The shape and SVBDRF 18 can be stored in storage 19 (step S4) and subsequently used by a rendering system 20 to display the object 2 on a display 21 (step S5).

The data processing system 15 implements a deep network 22 which is trained using training data 23 and which generates the appearance- and shape-related maps 18 from the captured inputs 5 and optionally the computed inputs 14. Linear polarization cues in surface reflectance are used to provide strong initial cues to the deep network 22. While polarization imaging close to the Brewster angle allows extraction of many appearance cues directly, this can generally only be done reliably for planar surfaces and reference is made to Riviere et al. ibid. Accordingly, deep learning is used to compensate for the limitations of the polarization signal over the surface of a 3D object 2.

The training data 23 can take the form of synthetic training data, measured training data (or "real training data"), or a mixture of synthetic and measured training data. Synthesizing training data can help to generate a large volume of training data more quickly than acquiring measured training data.

Referring in particular to FIG. 1, the deep network 22 includes a parallel arrangement of a U-Net image-to-image network 29 (hereinafter referred to simply as the "U-Net") and a global features network 30 similar to that described in Deschaintre et al. ibid., which is incorporated herein by reference.

The U-Net 29 is trained to employ polarization images 5 of the object 2 as input along with explicit cues 14 provided by the polarization signal 5, and to output five maps 18 related to appearance and shape, namely diffuse and specular albedo $18_2$, $18_4$, specular roughness $18_3$, surface normal $18_1$ and depth $18_5$. From the acquired polarization information, two specific cues $14_1$, $14_2$ (i.e., channels of information) are computed to provide as additional input to the deep network 22. The first is a reflectance cue $14_1$ in the form of normalized diffuse color computed by normalizing the reflectance minima obtained (through sinusoidal fitting) from the acquired polarized images. The second is a shape cue $14_2$, in particular a π-ambiguous shape map, in the form of a normalized Stokes map. The normalized Stokes map encodes the self-normalized $s_1$, $s_2$ components of Stokes parameters of linear polarization and computes the normalized variation in the reflectance under different polarization filter orientations, providing a π ambiguous initialization for surface normals. An angle of polarization map computed from $s_1$, $s_2$ could be used instead of the normalized Stokes map as a shape cue.

To train the deep network 22, a synthetic dataset 23 is created (by the generator 24) consisting of 20 complex 3D geometries of realistic objects mapped with procedurally and artistically generated SVBRDFs based on a dataset disclosed in V. Deschaintre et al.: "Guided fine-tuning for large-scale material transfer", Computer Graphics Forum (Proceedings of the Eurographics Symposium on Rendering), volume 39, no. 4 (2020). Other combinations can be used. For example, other, different 3D geometries can be used, other different numbers of geometries and other, different materials can be used, and/or another different SVBRDF dataset can also be employed for creating the training dataset. Specialised decoder branches $33_1$, $33_2$, $33_3$ (FIG. 8) are employed in the network 22 to output high-quality shape and reflectance parameter maps, and a mix of L1 and rendering loss is used to train the network 22. Rendering loss is further improved by developing a differentiable polarized renderer, providing better gradients on the diffuse and specular behaviours.

The image-capturing system 4 (i.e., the camera 6, the polarizer 7, the lens 8 and the flash 9), the image processing system 6, the digital processing system 15 and the rendering system 20 may be integrated into one device.

Method
Data Generation

Figure 2D:
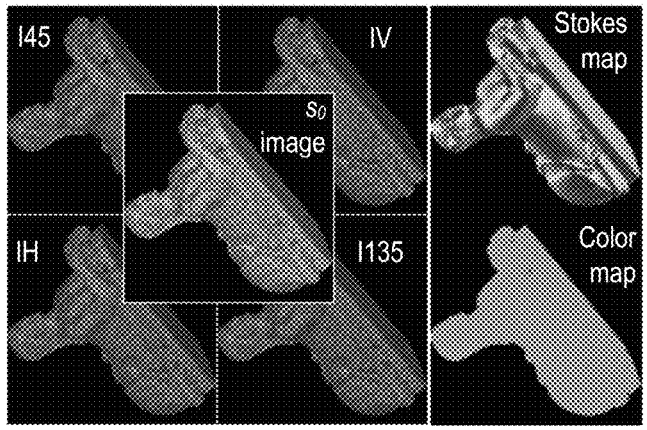
FIG. 2D illustrates synthetic training data used to train a deep network shown.
Figure 2D:
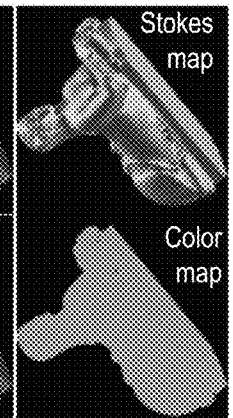
Figure 2D:
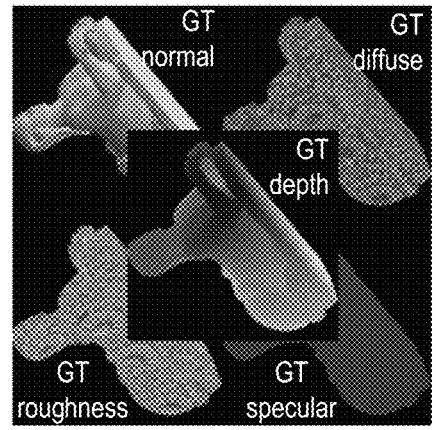
Figure 3:
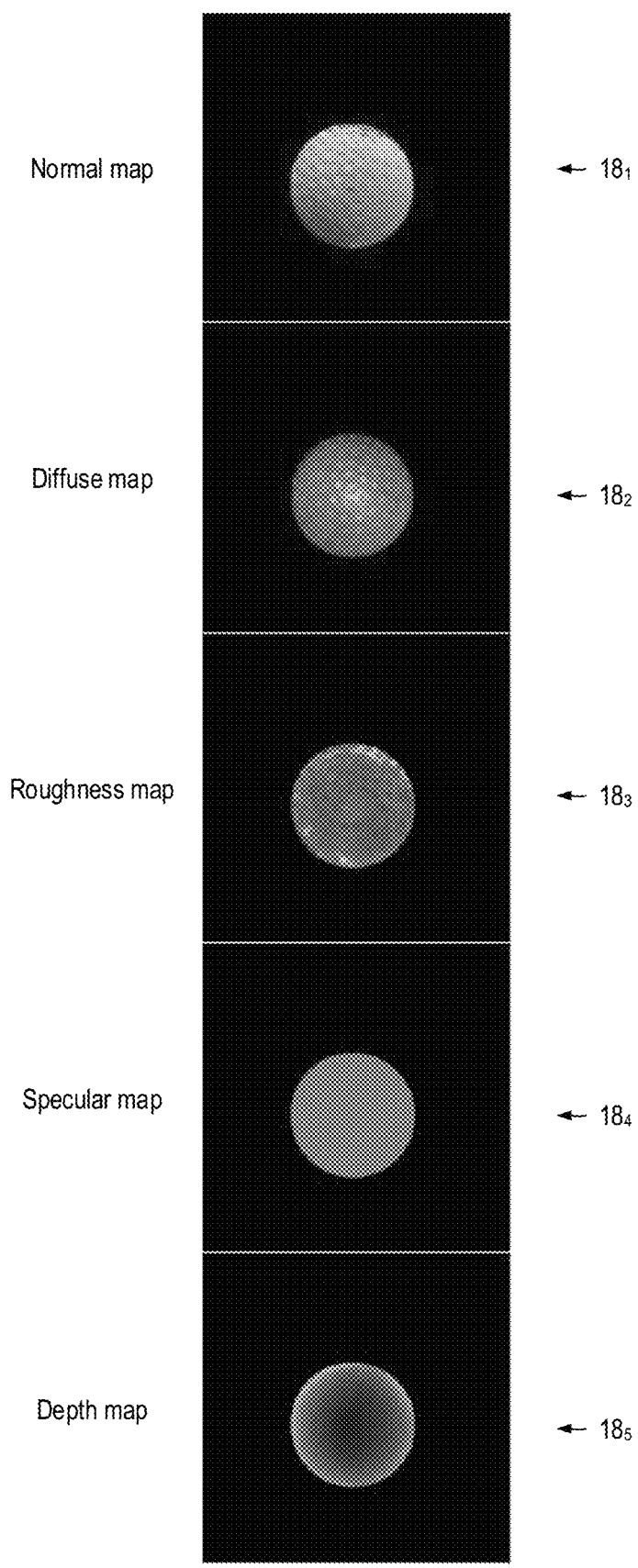
FIG. 3 illustrates shape and SVBRDF estimated for an object in the form of normal, diffuse, specular, roughness and depth maps.
Figure 5:
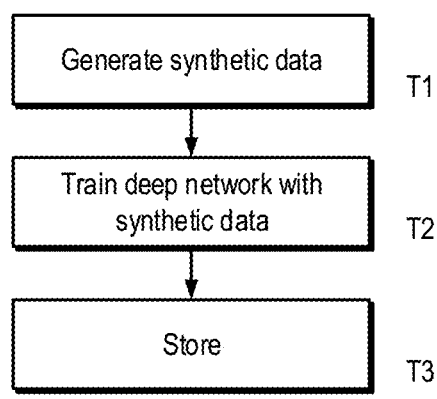
FIG. 5 is a process flow diagram of a method of training a deep network.

Referring to FIGS. 1, 2D and 5, leveraging polarization cues with a deep network 22, requires a large dataset of objects to be captured with different polarizer orientations 27, 28 along with ground truth SVBRDF 29. Measuring such a large dataset would so require advanced, expensive equipment and considerable time, although this approach can be used. Instead, synthetic data rendering is used to create a dataset 23 of over 100,000 sets of images (step $T_1$).

The training dataset 23 is generated using 20 complex meshes of realistic objects and 2000 different materials (SVBRDFs). The test dataset 23 uses 6 unique meshes and 30 materials. For each set of polarization images in the training set 27, a mesh and material are selected and randomly rotated to augment diversity of the training data.

Renderings are generated for four polarization filter angles, namely 0°, 45°, 90°, and 135°, and the $s_0$ image, alongside the ground truth SVBRDF and depth maps. The dataset is further augmented with a normalized Stokes map and normalized diffuse color that are computed from the different polarized renderings. Optionally, the dataset could be also augmented with a degree of polarization (DOP) map.

Figure 6B:
FIG. 6B is a practical signal captured with a measured Stokes map of a rubber ball with embossed text under flash illumination.
Figure 6A:
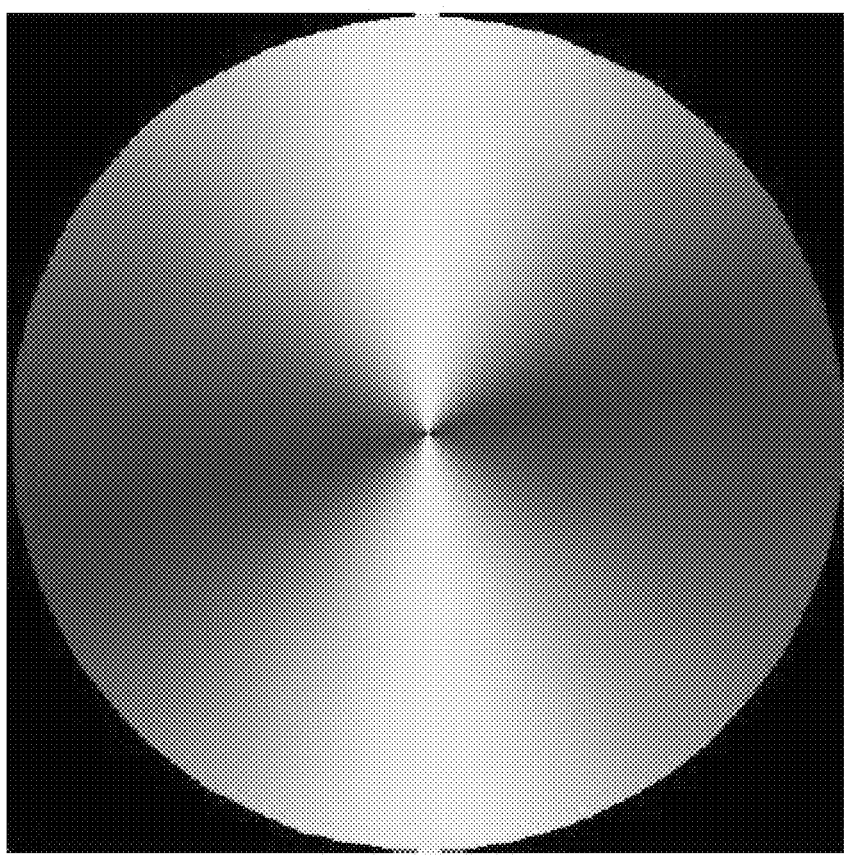
FIG. 6A is an ideal normalized Stokes map for a sphere under frontal flash illumination.

Referring to FIGS. 6A and 6B, a perfect Stokes map does not occur in real acquisition.

FIG. 6A shows an ideal normalized Stokes map for a sphere under frontal flash illumination. RGB color coding for Stokes vectors, R ($s_0$) is set to 0.5, G ($s_1$) and B ($s_2$) are normalised and mapped to 0-1 range for visualisation. FIG. 6B illustrates the signal captured in practice with a measured Stokes map of a rubber ball with embossed text under flash illumination.

Synthetic generation is augmented with Gaussian noise to mimic the perturbation in the acquisition process. To better benefit from polarization cues, HDR data capture is simulated and 16-bit portable graphics format (PNG) images are used.

FIG. 2D gives examples of the synthetic dataset 23.
Polarization Information
Stokes Parameters The polarization state of a reflected light gives useful cues about the surface normal. The transformation of the Stokes parameters upon reflection largely depends on the normal of the surface. Measuring the reflected Stokes parameters under unpolarized light (e.g., flash illumination) can be achieved using three observations with linear polarizing filter set to 0°, 45° and 90°. These three images, named $I_H$, $I_{45}$ and $I_V$, can be so used to calculate the Stokes parameters of linear polarization per pixel with the following equations:

$$s_0 = I_h + I_v \qquad (1)$$
$$s_1 = I_h - I_v$$
$$s_2 = 2 * I_{45} - s_0$$

Here, $s_0$ represents the unfiltered reflectance, $s_1$ represents the horizontally polarized reflectance, and $s_2$ represents the 450 polarization reflectance.

Directly-measured Stokes parameters depend on the bidirectional reflectance distribution function (BRDF) of the surface and the lighting conditions. $s_1$ and $s_2$ are normalised with respect to each other to extract the directional information about the surface normal up to a π ambiguity. Normalized Stokes parameters are used as an additional cue for the network, helping to disambiguate the shape from the reflectance, improving shape and SVBRDF acquisition.

In the general case, measured Stokes parameters consist of a mix of contributions from specular and diffuse polarization caused by their respective reflectance. These two types of polarization are captured by the Fresnel equations on surface reflectance and transmission for specular and diffuse polarization respectively. The magnitude of specular polarization usually dominates under direct area illumination. This tends be the reason why previous approaches to polarization under controlled spherical illumination modelled only specular polarization. Reference is made to A. Ghosh et al.: "Circularly polarized spherical illumination reflectometry", ACM Trans. Graph. (Proc. SIGGRAPH Asia), vol. 29, pp. 162:1-162:12 (2010) and G. C. Guarnera et al.: "Estimating surface normals from spherical stokes reflectance fields", ECCV Workshop on Color and Photometry in Computer Vision, pages 340-349 (2012). On the other hand, due to the use of frontal flash illumination, the direct specular reflection is limited to a very small frontal patch, and most of the object surface instead exhibits diffuse polarization. Therefore, the normalized Stokes map is modelled as the result of diffuse polarization in the synthetic training data 23. Under more complex environmental illumination, an arbitrary mixture of specular and diffuse polarization can be observed, which is not currently modelled synthetically.

Diffuse Color

The polarization measurements are also employed to compute an estimate of normalized diffuse color. Rotating a linear polariser 7 (FIG. 1) in front of the camera lens 8 (FIG. 1) changes the observed intensity, as the specular reflection reaches its minimum when the polariser axis is parallel to the plane of incidence. As the flash light is white and the residual specular signal is weak, it is possible to extract an estimate of the normalized diffuse color.

In practice, the minimum intensity information does not necessarily fall exactly at the three polarization angles captured. Therefore, a sinusoidal fitting per pixel is performed by the image processing system 12 for each observation ($I_h$, $I_v$ and $I_{45}$) to fit the minimum value. The minimum reflectance values are normalised to extract the normalized diffuse color which are provided to the network as a reflectance cue. This color information can, however, be lost in some over saturated pixels caused by extreme dynamic range of flash illumination, despite HDR imaging, and may require image in-painting to fill in the saturated pixels.

Degree of Polarization (DOP) The above sinusoidal fitting to the measurements can also be used to compute the maximum reflectance value which in conjunction with the minimum reflectance value can be used to compute the degree of polarization (DOP) of reflectance as:

$$DOP=(\text{maximum}-\text{minimum})/(\text{maximum}+\text{minimum}) \quad (2)$$

DOP can encode some shape information for a 3D object.

Figures 12A, 12B, 12C:
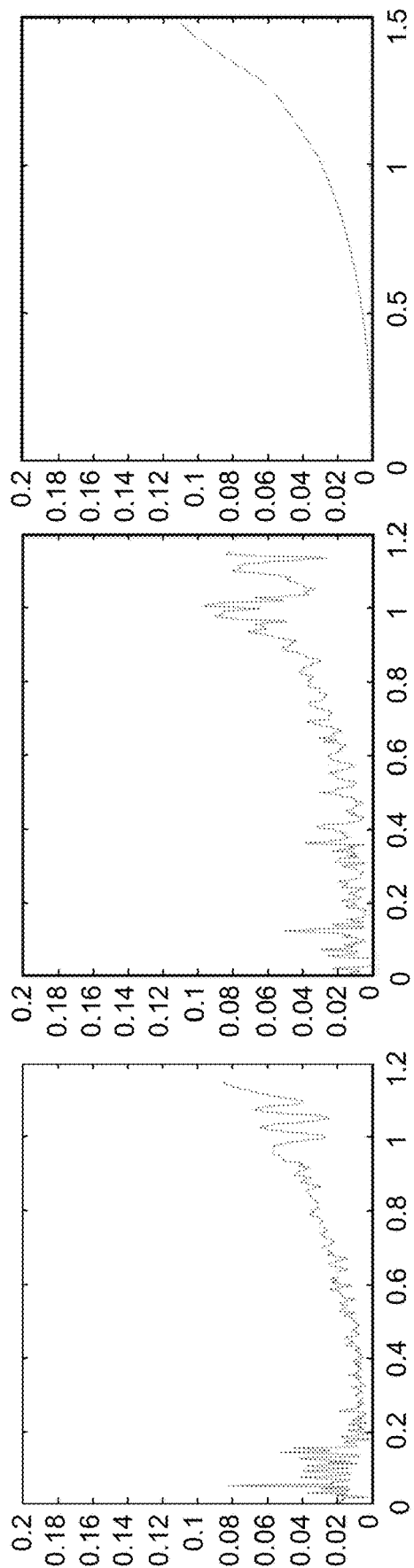
FIGS. 12A and 12B illustrates plots of angle of incidence (x-axis) versus measured diffuse degree of polarization (DOP) (y-axis) for two spherical balls.
FIG. 12C illustrates a plot of angle of incidence (x-axis) versus simulated DOP using a polynomial fit to measured data.

The DOP increases with increasing angle of incidence for diffuse polarization, as illustrated in, for example, FIGS. 12A-12C.

Figure 7A:
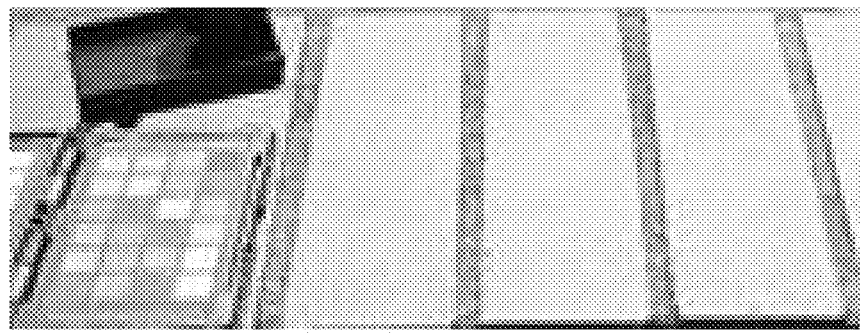
FIGS. 7A and 7B illustrate specular reflection on planar surfaces, namely a brick wall and a color chart, due to unpolarized sky acquired at oblique angle of incidence using a linear polarizer in front of a camera at horizontal 0° orientation ("Max") and at vertical 90° orientation ("Min") respectively.
Figure 7B:
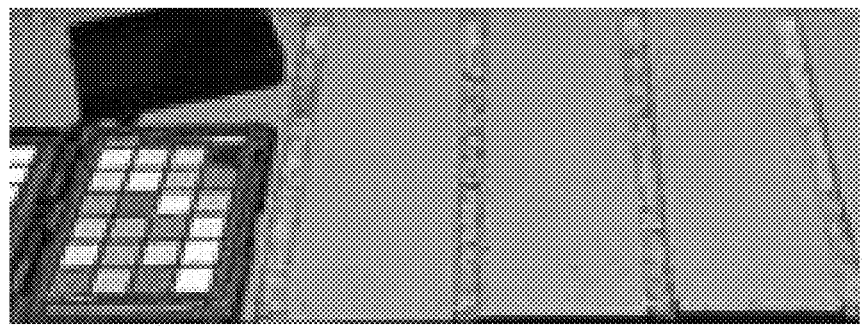
Figure 7C:
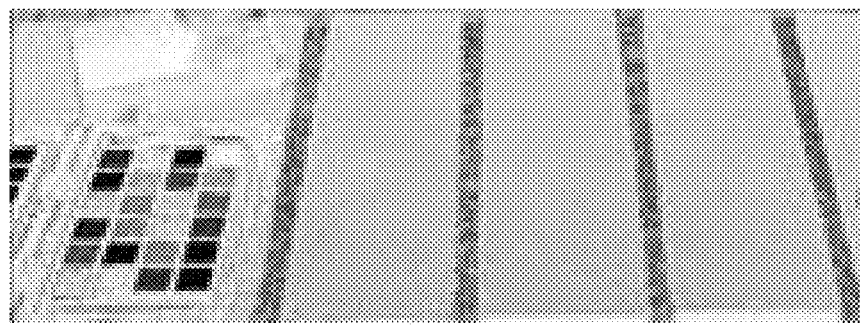
FIG. 7C is degree of polarization computed from Max and Min and which appears to contain cues about the surface specular roughness.

Referring to FIGS. 7A, 7B and 7C, for a planar object (such as a brick wall) illuminated by unpolarized light from the sky acquired at an oblique angle of incidence using a linear polarizer from a camera orientated at 0° and 90°, DOP due to specular polarization can also encode surface reflectance information related to specular roughness.

Network Architecture

Figure 8:
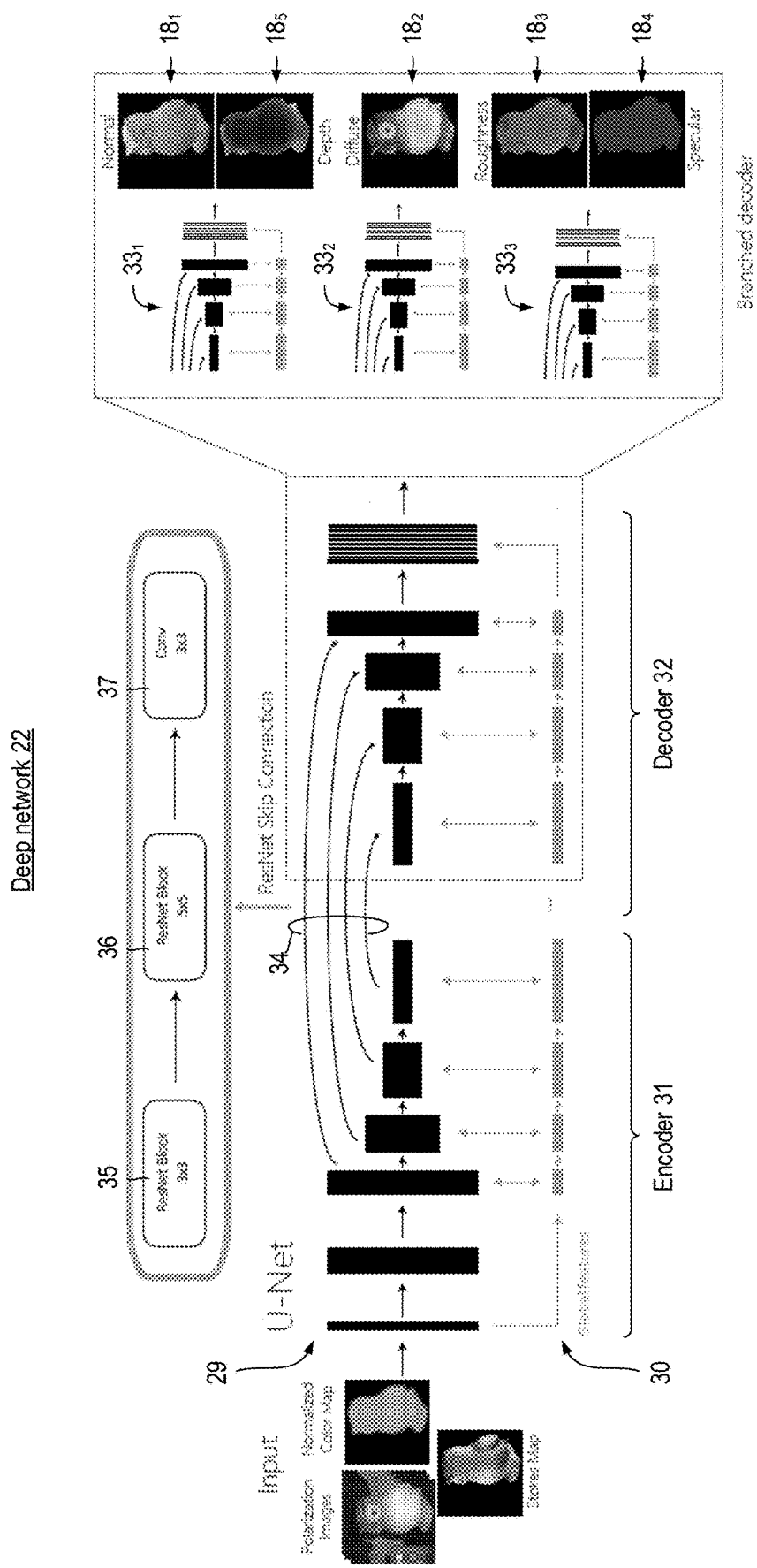
FIG. 8 illustrates a deep network architecture which has a general U-Net and in which decoders are divided into three different branches, each handling a related set of output map(s), namely normal and depth, diffuse albedo, roughness and specular albedo, and in which res-blocks are introduced on the skip connections between the encoder and the different branches of the decoder allowing the network to adapt the information forwarded to the different branches of the decoder.

Referring to FIG. 8, to estimate the shape and spatially varying reflectance of an so object using the acquisition method, the deep network 22 is trained to output diffuse and specular albedos $18_2$, $18_4$, specular roughness $18_3$, normal map $18_1$ and depth map $18_5$ of the input object 2 (FIG. 1). An encoder-decoder architecture 31, 32 is employed. The decoder architecture 32 is split it into three branches $33_1$, $33_2$, $33_3$, each specialized in an aspect of shape or appearance. The specular albedo and roughness maps $18_2$, $18_4$ are grouped in one branch $33_3$ and the normal and depth maps $18_1$, $18_5$ are grouped in another $33_2$ as they are closely related. Finally, a third branch $33_2$ handles the diffuse albedo $18_2$. All three branches $33_1$, $33_2$, $33_3$ of the decoder 32 receive the same inputs from the encoder 31, but the skip connections 34 are made more flexible. In particular, two res-blocks 35, 36 and a convolution layer 37 are added to the skip connections, allowing the training process to adjust the information transferred to each decoder branch $33_1$, $33_2$, $33_3$ from the encoder 31. The res-block 35, 36 on the skip connections 34 allows the network 22 to forward the most relevant information to each separate decoder branch $33_1$, $33_2$, $33_3$ helping to decorrelate the diffuse response from the other parameters. This can help to preserve high-frequency features in all of the reflectance and shape maps as each of these have a different scale and dynamic range, as well as decorrelating the details in the predicted maps from each other. The network is trained on 512×512 images.

Polarization Rendering Loss

The network 22 is trained using two losses, namely an L1 loss to regularize the training, computing an absolute difference between the output maps and the targets, and a polarized rendering loss. The rendering loss used by Deschaintre et al. only computes losses (i.e., errors) for standard renderings based on predicted versus ground truth reflectance and shape maps. Polarized rendering loss computes losses (i.e., errors) for more sophisticated renderings that include specular and diffuse polarization simulations. Rendering losses can be efficient in training reflectance acquisition methods. These are improved by simulating the polarization behaviour of surface reflectance in a differentiable fashion, allowing gradients of rendering effects from diffuse and specular polarization to be taken into account in the training process.

Acquisition Procedure

Referring again to FIGS. 1 and 2A, the acquisition process involves capturing an object 2 under flash illumination with three polarization filter orientations, namely 0°, 45°, and 90°. As explained earlier, a DSLR camera 6, a tripod 10 and a linear polarizing filter 7 are used and the polarizer 7 is manually rotated on the lens 8 to acquire the data 5. However, polarization sensors, e.g., Sony® Polarsens® can be used which allow rapid capture of this information in a single shot. A small color checker 11 next to the captured object 2 is used for white balancing and HDR capture, using auto-exposure bracketing on the camera, to better extract the polarization information and match the object appearance as closely as possible. The acquisition process takes around a minute.

A typical acquisition scene is illustrated in FIG. 2A.

Evaluation

As explained earlier, polarization imaging and flash illumination is used to recover 3D objects shape and SVBRDF. To provide comparisons, the results of Li et al. ibid. and Boss et al. ibid. are used as comparative examples since the methods described therein target similar outputs with regular photographs under flash illumination.

Comparisons

Quantitative Comparisons

The method herein described is quantitatively compared to Li et al. ibid. and Boss et al. ibid. using L1 distance. The error on the normal maps, depth and directly on renderings are evaluated as these are not affected by the different BRDF models chosen by the different methods. This numerical evaluation is performed on 250 combinations of 6 randomly rotated meshes and 30 SVBRDF. The rendering error is computed over 20 renderings for each result with varying light properties. Table 1 below shows that the method strongly benefits from the polarization cues, white balancing and HDR imaging with significantly lower error on depth, normal and renderings.

TABLE 1

|  | Li et al. | Boss et al. | Embodiment |
| --- | --- | --- | --- |
| Normal | 42.23° | 47.69° | 12.00° |
| Depth | 0.196 | 0.189 | 0.0736 |
| Renderings | 0.058 | 0.105 | 0.013 |

The method herein described and those of Li et al. ibid. and Boss et al. ibid. are evaluated using the synthetic test set. The normal error is reported in degrees, while the rest is reported as L1 distance. For all parameters, a lower value is better. 20 renderings are compared with different illumination for each result rather than the parameters maps as the material model used by these methods vary. The method can be seen are leveraging white balance, HDR inputs and polarization cues, producing significantly better results on the complex shapes Qualitative Comparisons For qualitative comparison, the method herein described is evaluated against Li et al. ibid. and Boss et al. ibid. on synthetic data and on real data, i.e., ground truth (or "GT").

FIG. 8 shows a comparison based on synthetic test data. By leveraging polarization information, the method produces more plausible results and better captures the appearance of the input. While the re-renderings (far right column) and shape can be directly compared, the BRDF parameters maps are provided for qualitative evaluation as different BRDF models are used by the different methods. The inputs are adapted to each method and the published codes for Li et al. ibid. and Boss et al. ibid. are used to generate results.

Due to the polarization cues, the method captures the global 3D shape of the object much better than single-image methods. An important distinction over each of these is that the method does not correlate the SVBRDF variation in the input to normal variation in the output as the Stokes map disambiguate this information.

Figure 9:
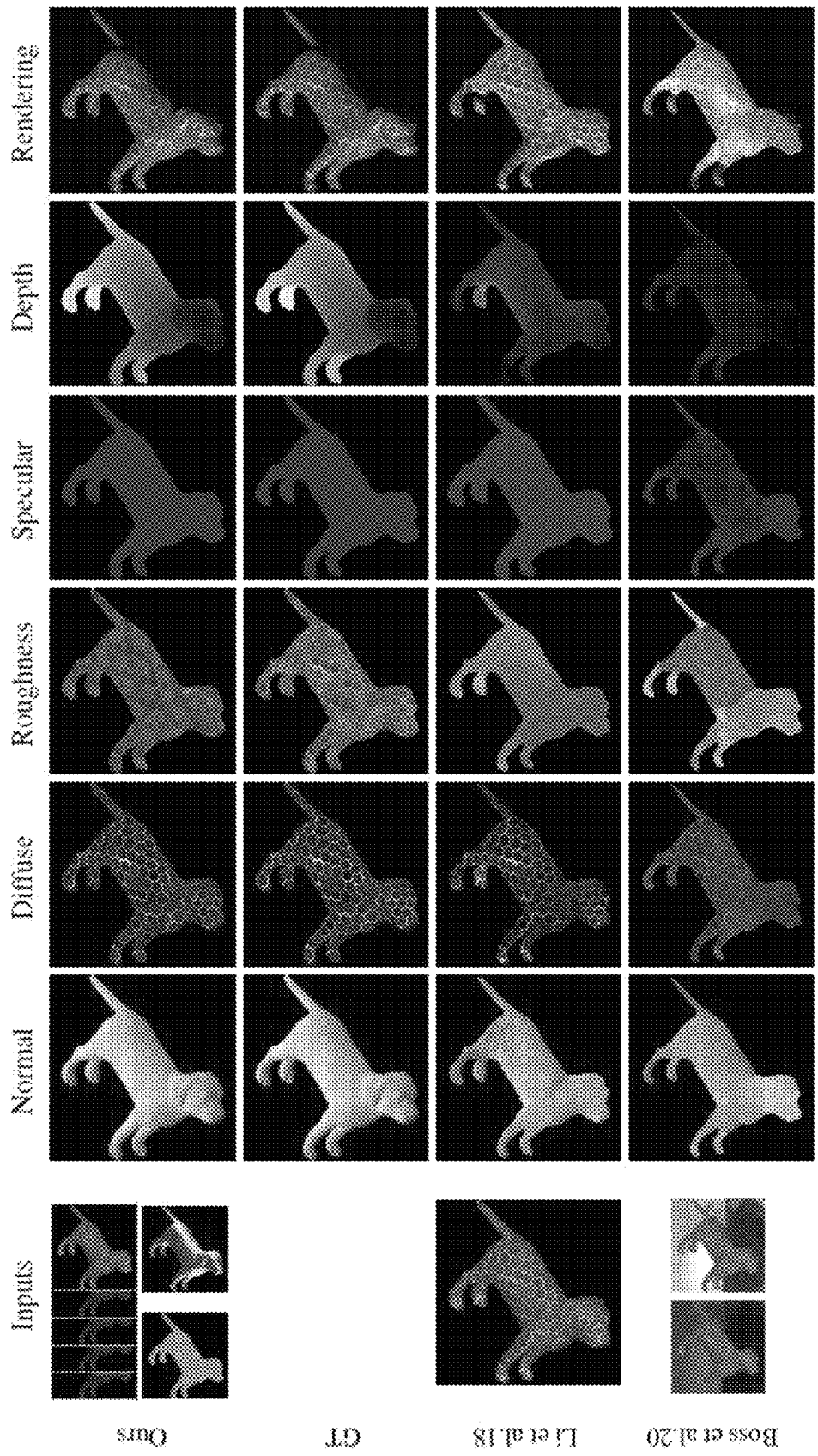
FIG. 9 illustrates comparisons of results on synthetic data produced by the method herein described and those produced by methods described in Li et al. and Boss et al.
Figure 10:
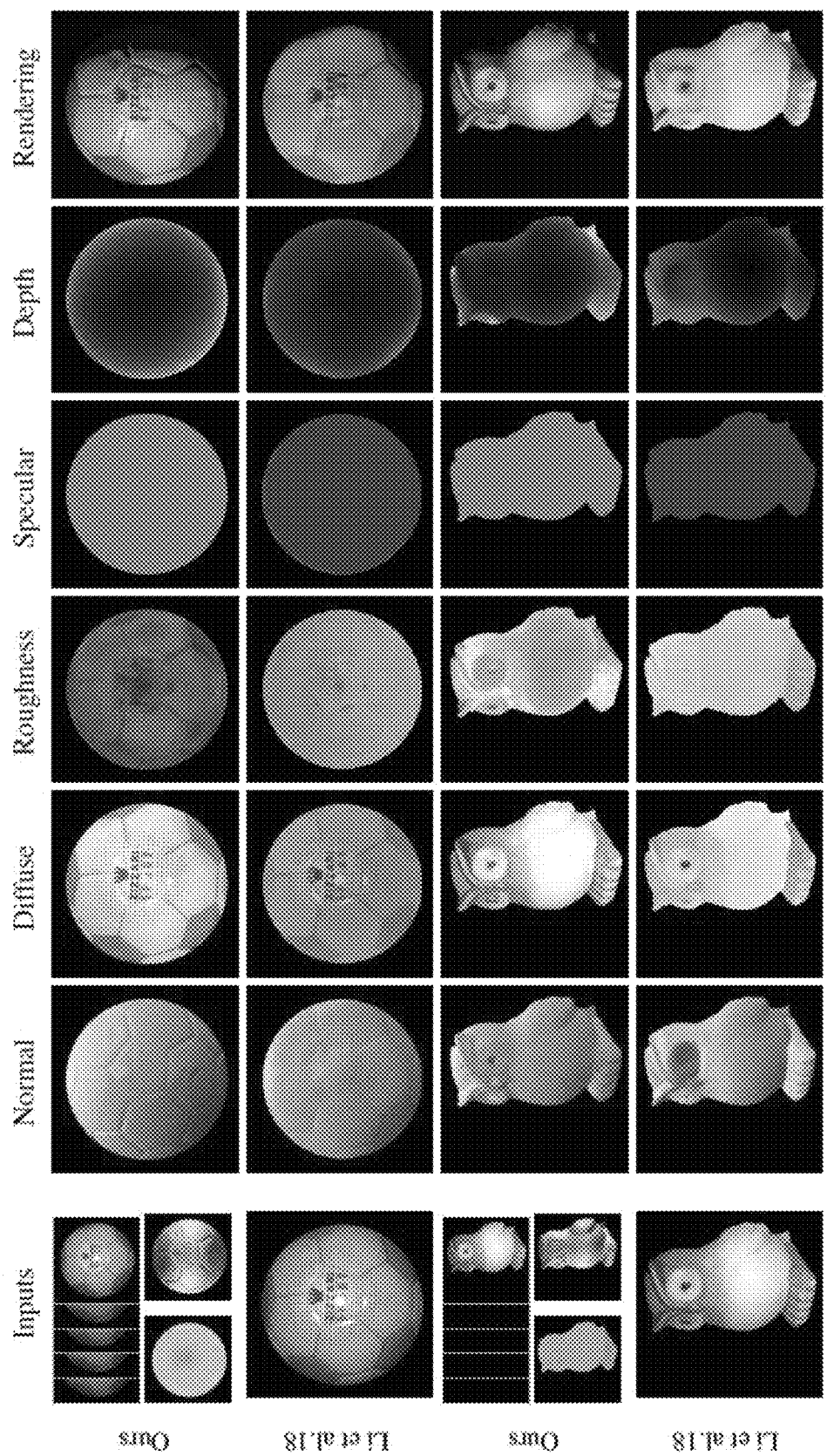
FIG. 10 illustrates comparisons of results on real objects produced by the method herein described and those produced by the method described in Li et al.

FIG. 9 shows results on real objects. The method better recovers the global shape of the object as well as its appearance showing that it generalizes well to real acquisition. This is particularly seen in the rendering under a new flash lighting direction where the results using the method demonstrate appropriate shading variation due to the estimated surface normal and reflectance maps.

Ablation Study

Components are evaluated by removing them one at a time. The error is quantitatively evaluated and reported in Table 2 below.

TABLE 2

|  | Skip | Loss | Polarization | Method |
| --- | --- | --- | --- | --- |
| Normal | 14.17° | 12.38° | 24.14° | 12.00° |
| Diffuse | 0.0274 | 0.0462 | 0.0417 | 0.0204 |
| Roughness | 0.0622 | 0.0717 | 0.0901 | 0.0616 |
| Specular | 0.0429 | 0.0190 | 0.0323 | 0.0157 |
| Depth | 0.0813 | 0.0854 | 0.1107 | 0.0736 |
| Rendering | 0.016 | 0.019 | 0.027 | 0.013 |

The contribution of the different technical components computed over the test set is evaluated. For each column, training was performed without the component, namely (a) improved skip connections, (b) polarized rendering loss and (c) polarization cues. The normal error is reported in degrees, while the rest are reported as an L1 distance. For all parameters, a lower value is better. The use of both improved skip connections and polarized rendering loss improve results, but most importantly the polarization cues significantly improve the results on all recovered properties.

Improved Skip Connections

The first column of Table 2 evaluates the method with standard skip connections. The res-block 35, 36 (FIG. 8) on the skip connections allows the network 22 (FIG. 8) to forward the most relevant information to each separate decoder branch $33_1$, $33_2$, $33_3$ (FIG. 8) helping to decorrelate diffuse response from the other parameters. Such a correlation effect is visible in FIG. 8 in Li et al.'s result, for example.

Polarized Rendering Loss

The second column of Table 2 evaluates the method with a rendering loss similar to V. Deschaintre et al. ibid. The differentiable polarized renderings that are implemented help the network to better separate the diffuse and specular signal with small improvement in the roughness and specular, but mostly in de-lighting the diffuse albedo.

Polarization Cues

The third column of Table 2 evaluates the method with a single HDR, white balanced flash input without any polarization information. All the recovered parameters significantly suffer from the absence of polarization cues. It is found that the single image method rendering error to be lower than compared methods, which can be attributed to the use of a white balanced, HDR input and training on complex meshes, helping to recover the global curvature.

Limitations

The method is currently limited to flash illumination where the polarization signal is dominated by diffuse polarization. The more general case of acquisition in arbitrary environmental illumination including outdoor illumination is more challenging due to the potentially complex mixing of specular and diffuse polarization signal.

Figures 11A, 11B:
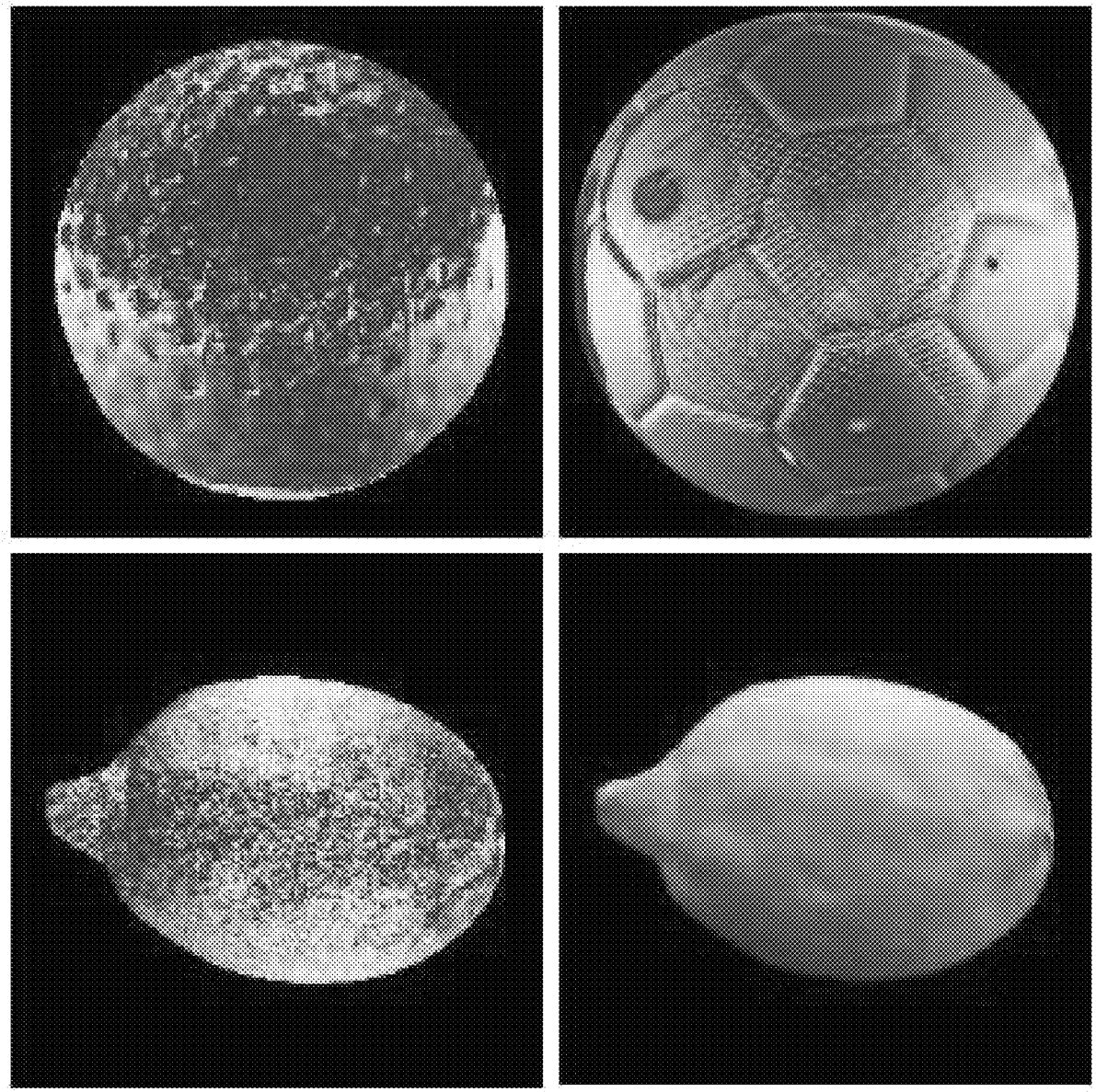
FIG. 11A illustrates a mixed Stokes map of a ball under complex lighting.
FIG. 11B illustrate an example of an exploitable pure Stokes map of a lemon

Referring to FIGS. 11A and 11B, in experiments, it was found that this can result in inconsistent cues with strong discontinuities in the Stokes map as shown in FIG. 11A. This inconsistency comes from the different light sources and inter-reflection composing the illumination on a 3D object in the wild. Interesting information can be retrieved in some cases where specular polarization dominates providing a cleaner signal similar to the flash illumination case, as shown in FIG. 11B. Thus, whereas flash illumination arrangement can be used to exploit a clean signal of diffuse polarization for shape and reflectance estimation, other illumination arrangements such as an inwardly-directed circular or spherical array of light panels, for example, as described in US 2021/05015 A1, can be used to exploit a clean signal of specular polarization for shape and reflectance estimation. In the latter case, the deep network needs to be trained accordingly on specular polarization cues.

In principle there is a limitation to acquiring dielectric objects as the information extracted through polarization cues is valid for dielectrics. Metals polarize light elliptically. The dielectric assumption can still hold in practice for some metallic surfaces in the real world (metal-dielectric composite, weathering effects), and the acquisition approach should apply in such cases. The method is able to provide high quality estimate of surface normal and depth, as well as specular roughness. However, the diffuse albedo estimates, in some cases, have a few specular highlights baked-in due to saturation of the flash illumination during data capture (image in-painting can help in these saturated pixels).

Supplementary Material

Background

Stokes Parameters

The Stokes parameters are a set of values describe the polarization state of light in terms of its total intensity ($L(\vec{\omega})$), DOP (degree of polarization, P) and the shape parameters of the polarization ellipse. Stokes parameters consist of four vectors:

$$\vec{s} = \begin{bmatrix} s_0 \\ s_1 \\ s_2 \\ s_3 \end{bmatrix} = \begin{bmatrix} L(\vec{\omega}) \\ L(\vec{\omega})\mathcal{P}\cos 2\psi \cos 2\chi \\ L(\vec{\omega})\mathcal{P}\sin 2\psi \cos 2\chi \\ L(\vec{\omega})\mathcal{P}\sin 2\chi \end{bmatrix} \quad (A1)$$

where $s_0$ is the total intensity of the light, $s_1$ and $s_2$ are the intensity of 0° and +45° polarization respectively, and $s_3$ is the intensity of right circular polarization. Here $L(\vec{\omega})P$, $2\chi$ and $2\psi$ are the spherical coordinates of the three-dimensional vector of cartesian coordinates $[s_1, s_2, s_3]$ Mueller Calculus Upon reflection, the incident polarization state of light is altered based on the following Mueller calculus:

$$s_{ref} = M_{rot}(-\phi) M_{ref}(\theta_i; \delta; \vec{n}) M_{rot}(\phi) s_i \quad (A2)$$

where $s_i$ and $s_{ref}$ are Stokes vectors of the incident light and reflected light respectively, $M_{rot}(\phi)$ is the Mueller matrix of rotation which rotates the incident Stokes vector in the global frame (same as the camera frame in our case) into the canonical frame of reference (plane of incidence), $M_{ref}(\theta_i; \delta; \vec{n})$ is the concatenation of the Mueller reflection matrix and a linear retarder of phase $\delta$. The $M_{rot}(-\phi)$ term rotates the result back to the camera frame, hence the $(-\phi)$ angle.

Mueller Rotation Matrix

The concatenation of the Mueller matrices of a linear di-attenuator $M_{ref}(\theta_i; \delta; \vec{n})$ calculates the Stokes vectors of light upon reflection off the surface, in the local plane of incidence frame. However, the initial Stokes vectors are defined in the global frame and therefore the Mueller rotation Matrix is required to align these two frames:

$$M_{rot}(\phi) = \begin{bmatrix} 1 & 0 & 0 & 0 \\ 0 & \cos 2\phi & -\sin 2\phi & 0 \\ 0 & \sin 2\phi & \cos 2\phi & 0 \\ 0 & 0 & 0 & 1 \end{bmatrix} \quad (A3)$$

where $\phi$ is the angle between the y direction of the right-hand global frame and the so normal $\vec{n}$ of the surface.

Reflection and Transmission

An optical reflector which alters the polarization state of the incident light beam upon reflection can be described as a concatenation of the Mueller reflection matrix and a linear retarder of phase $\delta$:

$$M_{ref} = \begin{bmatrix} \frac{R_\perp + R_\parallel}{2} & \frac{R_\perp - R_\parallel}{2} & 0 & 0 \\ \frac{R_\perp - R_\parallel}{2} & \frac{R_\perp + R_\parallel}{2} & 0 & 0 \\ 0 & 0 & \sqrt{R_\parallel R_\perp} \cos\delta & \sqrt{R_\parallel R_\perp} \sin\delta \\ 0 & 0 & -\sqrt{R_\parallel R_\perp} \sin\delta & \sqrt{R_\parallel R_\perp} \cos\delta \end{bmatrix} \quad (A4)$$

where $R_\parallel$ and $R_\perp$ are parallel and perpendicular specular reflectance coefficients as calculated by Fresnel equations, and $\delta$ is the relevant phase between the parallel and perpendicular polarized components. The phase shift $\delta$ is a step function for dielectric material:

$\delta = \pi$ for any incidence angle before the Brewster angle $\delta = 0$ otherwise In case of diffuse polarization, specular reflectance coefficients are replaced by transmission coefficients:

$$M_{ref} = \begin{bmatrix} \frac{T_\perp + T_\parallel}{2} & \frac{T_\perp - T_\parallel}{2} & 0 & 0 \\ \frac{T_\perp - T_\parallel}{2} & \frac{T_\perp + T_\parallel}{2} & 0 & 0 \\ 0 & 0 & \sqrt{T_\parallel T_\perp} & \sqrt{T_\parallel T_\perp} \\ 0 & 0 & -\sqrt{T_\parallel T_\perp} & \sqrt{T_\parallel T_\perp} \end{bmatrix} \quad (A5)$$

and the refractive index of the material that light is incident on becomes $1/n_2$ as the light gets scattered and comes out from the material.

Synthetic Data Generation

According to G. Atkinson and E. Hancock: "Recovery of surface orientation from diffuse polarization", IEEE Transactions on Image Processing, volume 15, pp. 1653-1664 (2006) ("Atkinson & Hancock"), the degree of polarization (DOP) can be calculated as:

$$\rho = \frac{I_{90} - I_0}{(I_{90} + I_0)\cos 2\delta} \quad (A6)$$

Although equation A5 gives the correct diffuse polarization orientation in renderings compared to real measurements, the DOP however does not match actual observations. The observed diffuse DOP can go up to approximately 10% at an incidence angle of roughly 85° for common dielectric materials. In contrast, Atkinson & Hancock ibid. report the diffuse DOP as reaching roughly 25% for materials with an index of refraction (IOR) 1.4 at an 85° admittance angle.

In practice, due to a small amount of specular reflection with an opposite polarization orientation to the diffuse reflection, diffuse DOP is slightly reduced explaining the 10% observed.

FIGS. 12A and 12B show measured diffuse DOP (y-axis) for different angles of incidence (x-axis: in radians) on two spherical balls. FIG. 12C shows simulated diffuse DOP using a polynomial fit to measured data.

To better simulate real world diffuse polarization, the diffuse polarization is rendered based on equation A5, with the following approximations:

The diffuse polarization calculated for $\theta$ from range $0\text{-}\theta_{critcal}$ is stretched and mapped to range $0\text{-}\pi$. This is due to a mirror reflection assumption in equation A5 which yields a total internal reflection within the range $\theta_{critical}\text{-}\pi$ A polynomial function is further applied to the diffuse intensity $I_{d,final} = 4 * I_d^3$.

When calculating the $\theta$ angle for specular polarization, a half vector $\vec{\omega}_h$ of the light direction $\vec{\omega}_i$ and view direction $\vec{\omega}_o$ is used to replace the normal vector $\vec{n}$.

Deep Network Architecture

Referring again to FIG. 8, the architecture is based on U-Net 29 with a joint encoder 31 with 9 convolutions with stride 2 and kernel size 4. Between each layer a Leaky Relu ($\alpha$=0.2) activation function and Instance Normalization is used. Global statistics are maintained by using the Global feature secondary track 30. Reference is made to V. Deschaintre et al. ibid.

The decoder 32 is split into three branches $33_1$, $33_2$, $33_3$ specialized in different aspect of appearance. The branches $33_1$, $33_2$, $33_3$ respectively output (1) depth and normal $18_5$, $18_1$, (2) diffuse albedo $18_2$ and (3) roughness and specular albedo $18_3$, $18_4$. Each branch $33_1$, $33_2$, $33_3$ is symmetric to the encoder 32 with 9 deconvolutions. Between each layer a Leaky Relu ($\alpha$=0.2) activation function is also used. Each deconvolution is composed of a 2× upsampling and two 3×3 convolutions with stride 1.

The encoder 31 is connected to the decoder branches through skip connections 34 to propagate high frequency details. Two residual blocks 35, 36 and a 3×3 convolution are added to each skip connection 34 allowing the network 22 to learn which information is most relevant to each decoder branch $33_1$, $33_2$, $33_3$. More than two residual blocks can be used. Each residual block 35, 36 is composed of two 3×3 convolutional layers with stride 1 and Relu activation functions.

Training

The network 22 was trained for 5 days (1,000,000 steps) on a GPU, in particular, a single Nvidia RTX 2080 T1. A batch size of 2 and a learning rate of 0:00002 were used. The network is fully convolutional and trained on 512×512 images.

The loss function uses a distance between the parameter maps for regularization with a weight of 0.25 and a polarized rendering loss, computing four polarization angles for three different lighting conditions with a weight of 1.0. The distance is measured between parameters with a L1 distance except for the normal map for which a cosine distance is used.

Illumination

As explained earlier, images can generally be acquired under three scenarios:

Images can be acquired using frontal flash in which case diffuse polarization dominates and the Stokes map is based on diffuse polarization. Diffuse polarization is independent of the polarization state of incoming illumination. Thus, flash light can be unpolarized, linearly polarized or even circular polarized.

Referring to FIGS. 13A to 13D, 14 and 15, polarization of flash does not change the so measured Stokes map and the deep network could be trained with a training data simulating the unpolarized or polarized state of flash illumination and/or with real measurements under such illumination for real data. FIGS. 13A to 13D illustrates simulation of a linearly-polarized frontal flash on a sphere with tiled green stone material and FIG. 14 shows the resulting Stokes map which is dominated by diffuse polarization which is independent of the polarization state of the flash.

Images can be acquired using uniform surrounding illumination (for example, spherical or hemispherical) in which case specular polarization dominates. In this case too, a very similar Stokes maps can be obtained using unpolarized or circularly polarized illumination. The Stokes map due to specular polarization is a rotated version of the Stokes map due to diffuse polarization. Thus, the deep network could be trained with a training data simulating the unpolarized or circularly polarized state of uniform surrounding spherical/hemispherical illumination and/or with similar real measured data.

The main difference between flash illumination and surrounding illumination is that, with uniform surrounding illumination, if the incident illumination is linearly polarized in a specific orientation, then the resulting Stokes map may not be a good cue for surface shape (unless the object is planar) and so may be sub-optimal for shape cue. On the other hand, linearly-polarized illumination can provide very good reflectance cue for diffuse and specular albedo.

Referring again to FIG. 8, a special case is planar objects where uniform illumination on a planar object can be achieved using just an area-light source or light panel or display panel that is sufficiently large, or locally uniform environmental illumination. As shown in FIG. 8, for such planar objects, an area-light/panel illumination or environmental illumination can be incident from the front (near normal incidence) or obliquely at near Brewster angle of incidence. Specular polarization dominates in the resulting surface reflectance of a planar object, and similar to the surrounding illumination case, the deep network could be trained with a training data simulating unpolarized or circularly polarized state of uniform illumination from an area-light/light-panel or environment and/or with similar real measured data. Furthermore, for the case of planar objects, the deep network could also be trained with a training data simulating linearly polarized state of uniform illumination from an area-light/light-panel or environment and/or with similar real measured data.

Applications

Image capture for shape and spatially varying reflectance estimation here described can be used to render images used in computer graphics applications such as visualization, visual effects, augmented reality, virtual reality, computer games and e-commerce.

Modifications

It will be appreciated that various modifications may be made to the embodiments hereinbefore described. Such modifications may involve equivalent and other features which are already known in the design, manufacture and use of systems for acquiring shape and spatially-varying reflectance of objects, and component parts thereof and which may be used instead of or in addition to features already described herein. Features of one embodiment may be replaced or supplemented by features of another embodiment.

The object may be a plant, animal or human (e.g., the whole body) or a part of a plant, animal or human (such as a face or hand). The object may be an inanimate object or part of an inanimate object.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method, comprising:
   receiving a set of at least three images of an object including at least two linearly-polarized images and at least one color image, wherein the three images have the same view of the object and are acquired under the same illumination condition in which either diffuse polarization or specular polarization dominates in surface reflectance, wherein a set of Stokes parameters s0, s1 and s2 is determinable from the at least three images;
   generating three-dimensional shape and spatially-varying reflectance of the object from the set of at least three images using a deep neural network trained with a plurality of sets of training images, each of the plurality of sets of training images including at least three training images including at least two linearly-polarized training images and at least one color image from which a respective set of Stokes parameters s0, s1 and s2 is determinable; and storing said three-dimensional shape and spatially-varying reflectance generated by the deep neural network.

2. The method of claim 1, further comprising:

receiving a polarization shape map generated from the Stokes parameters s1 and s2 for the object, and/or a colour map and/or a degree of polarization (DOP) map;

wherein the three-dimensional shape and spatially-varying reflectance is generated from the set of at least three images and the polarization shape map and/or the colour map and/or the DOP map.

3. The method of claim 1, further comprising:

generating a polarization shape map from the Stokes parameters s1 and s2 for the object and/or a colour map and/or a degree of polarization (DOP) map using the set of at least three images;

wherein the three-dimensional shape and spatially-varying reflectance is generated from the set of at least three images and the polarization shape map and/or the colour map and/or the DOP map.

4. The method of claim 2, wherein the color map is a diffuse color map.

5. The method of claim 2, wherein the polarization shape map is a normalised Stokes map or an angle of polarization map.

6. The method of claim 1, wherein the plurality of sets of training images comprises a plurality of sets of synthesized training images.

7. The method of claim 1, wherein the plurality of sets of training images comprises a plurality of sets of measured training images.

8. The method of claim 1, wherein the at least three images of the object comprise three linearly-polarized color images.

9. The method of claim 1, wherein the three-dimensional shape comprises:

a surface normal map, and/or a depth map.

10. The method of claim 1, wherein the spatially-varying reflectance comprises:

a diffuse albedo map, and a specular albedo map, and/or a specular roughness map.

11. The method of claim 1, wherein the deep neural network comprises a convolutional neural network having an encoder and a decoder and skip connections between the encoder and decoder.

12. The method of claim 11, wherein the decoder is a branched decoder comprising of at least two branches.

13. The method of claim 11, wherein the skip connections include at least one residual block or a series of at least two residual blocks.

14. The method of claim 1, wherein the deep neural network is trained by considering rendering losses that include polarized rendering loss over simulated linearly polarized images.

15. The method of claim 1, wherein the set of at least three images are acquired using frontal flash illumination incident on the object so as to cause diffuse polarization to dominate in the surface reflectance.

16. The method of claim 15, wherein the frontal flash illumination is unpolarized.

17. The method of claim 15, wherein the frontal flash illumination is linearly-polarized or circularly-polarized.

18. The method of claim 1, wherein the set of at least three images are acquired using uniform illumination disposed around and directed at the object so as to cause specular polarization to dominate in the surface reflectance.

19. The method of claim 18, wherein the uniform illumination is unpolarized or circularly-polarized.

20. The method of claim 18, wherein the object is a planar object and wherein uniform illumination is linearly-polarized.

21. The method of claim 18, wherein the uniform illumination comprises:

one or more light sources and, optional, one or more reflecting surfaces arranged around the object to provide uniform illumination on the object, optionally wherein the one or more light sources comprise a plurality of light sources arranged to substantially cover a hemisphere or sphere of directions around the object.

22. A computer program product comprising a non-transitory computer-readable medium storing a computer program comprising instructions which, when executed by at least one processor, causes the at least one processor to perform the method of claim 1.

23. A device, comprising:

at least one processor; and storage;

the at least one processor configured:

in response to receiving a set of at least three images of an object including at least two linearly-polarized images and at least one color image, wherein the three images have the same view of the object and are acquired under the same illumination condition in which either diffuse polarization or specular polarization dominates in surface reflectance, wherein a set of Stokes parameters s0, s1 and s2 is determinable from the at least three images, to generate three-dimensional shape and spatially-varying reflectance of the object from the set of at least three images using a deep neural network trained with a plurality of sets of training images, each of the plurality of sets of training images including at least three training images including at least two linearly-polarized training images and at least one color training image from which a respective set of Stokes parameters s0, s1 and s2 is determinable and to store said three-dimensional shape and spatially-varying reflectance generated by the deep neural network in the storage.

* * * * *